United States Patent Office 2,851,480
Patented Sept. 9, 1958

2,851,480

PREPARATION OF OLFACTORY MATERIALS FROM DIHYDROMYRCENE

Garry C. Kitchens, Packanack Lake, N. J., assignor to The Givaudan Corporation, New York, N. Y., a corporation of New Jersey No Drawing. Application March 30, 1955
Serial No. 498,103

5 Claims. (Cl. 260—489)

The present invention relates to the preparation of olfactory materials from dihydromyrcene. More especially, this invention deals with a novel process of preparing dihydrolinalool and related materials from dihydromyrcene in good yields.

It has been known that desirable olfactory products can be prepared from natural linalool and linalool-containing oils. Such products are costly as they depend upon imported source materials.

Efforts to overcome this dependence on costly imported raw materials have been made and some suggestions toward this end have appeared in the patent literature. These suggestions involve the conversion of myrcene to esters, alcohols and the like, by chemical means. Unfortunately, when such suggestions have been followed it has been found that the products obtained thereby fall far short of possessing the desirable olfactory characteristics of linalool and its derivatives. Indeed, the products obtainable in accordance with these previous suggestions offer no advantages over the use of commercially available, inexpensive materials such as terpinyl acetate and terpineol.

It is an object of this invention to provide a process for making linalool-like materials of desirable olfactory characteristics from a domestically-available source in a technically-simple and commercially-feasible manner.

It is a further object of this invention to furnish dihydrolinalool and derivatives prepared from dihydromyrcene in good yields and at low cost, the olfactory properties of the dihydrolinalool and derivatives being such as to compare favorably with those of linalool and its derivatives.

Other objects of this invention will become apparent to those skilled in the art from the following description.

The foregoing and other objects are attained in accordance with my present invention, wherein dihydromyrcene is treated with a hydrogen halide to form dihydrolinalyl halide. The latter can then be saponified to form dihydrolinalool, which may be further hydrogenated to tetrahydrolinalool or converted into derivatives such as esters, e. g. the acetate by acetylation.

In general, the dihydrolinalyl halide is formed by passing hydrogen chloride or bromide into dihydromyrcene, preferably under anhydrous conditions. While equimolecular amounts of the reactants can be employed, I prefer to use an excess of dihydromyrcene, employing 1.1 mols of the latter per mol of hydrogen halide.

As indicated above, anhydrous hydrogen halide gives advantageous results. However, if desired aqueous hydrogen halide of 30% strength or higher can also be used.

The hydrogen halide is added gradually to the dihydromyrcene, depending on the reaction conditions. When a reaction temperature of 20° C. to 40° C. is used, the addition of the hydrogen halide takes from 2 to 8 hours, depending on the rate of cooling of the reaction mixtures. Temperatures as low as 0° C. or as high as 70° C. can be employed, if desired. Atmospheric pressure or slight super-atmospheric pressure conditions can be employed.

As a practical matter the addition of the hydrogen halide to the dihydromyrcene is stopped when the weight of the latter indicates that the theoretical amount, or substantially that amount has been absorbed by the dihydromyrcene.

The resulting dihydrolinalyl halide is saponified to dihydrolinalool in the presence of aqueous alkaline material. The preferred alkaline agents are potassium bicarbonate, sodium bicarbonate and calcium carbonate. Also useful in accordance with my present process are sodium hydroxide, potassium hydroxide, potassium carbonate and sodium acetate, among others.

Advantageous results have been obtained when 1 part by weight of dihydrolinalyl chloride has been saponified in the presence of about 0.3 part by weight of water and 0.5 part by weight of alkaline material. In the case of dihydrolinalyl bromide, the corresponding amounts are 1 part of bromide, 2.9 parts of water and 0.29 part of alkaline material. These amounts may be varied, if desired, it being understood that sufficient water is to be present to saponify the halide and sufficient alkaline material should be present to neutralize the liberated hydrogen halide.

The saponification of dihydrolinalyl chloride is advantageously conducted at a temperature of about 80° C. to 90° C. for about 48 hours. If desired temperatures within the range from about 60° C. to 100° C. can be used. The lower temperature will require a reaction period of about 96 hours and the upper temperature will require a reaction period of only 24 hours, in order to obtain the desired yields.

The saponification of dihydrolinalyl bromide is conducted at a temperature within the range of about 30° C. to 60° C.

In practice I find it advisable to terminate the saponification reaction when the amount of inorganic halide formed indicates that the reaction has proceeded to at least 80% of completion. The formed salt solution is then removed by decantation and fresh water and alkaline material are then added to the reaction mixture (I) to give, in the case of dihydrolinalyl chloride, a mixture containing 1 part by weight of I, 0.125 part of water and 0.06 part of alkaline material, preferably; and in the case of dihydrolinalyl bromide, a mixture containing 1 part of the bromide, 1.9 parts of water and 0.19 part of the alkaline material. The contents are then heated under the same conditions as before for about 8 hours in order to complete the saponification.

The resulting dihydrolinalool is acetylated under varied conditions. I prefer to employ acetic anhydride and sodium acetate to effect the acetylation. Advantageous results are obtained when the proportion of parts by weight of dihydrolinalool, acetic anhydride and sodium acetate is 1:0.66:0.24. If desired this proportion may be 1:1:0.5, on the same basis. When a temperature of about 90° C. to 110° C. is used in the acetylation step it takes about 35 hours to obtain the desired yield. Temperatures from about 60° C. to 120° C. can be used, if desired, the reaction period being accordingly varied.

In order further to clarify this invention the following examples are given, it being understood that these examples are for purposes of illustration and not limitation.

EXAMPLE 1

*Preparation of dihydrolinalyl chloride*

Twelve hundred ninety-nine (1,299) grams of redistilled myrcene (No. 85, The Glidden Co.) was hydrogenated, using 50 g. of wet Raney nickel catalyst washed with methanol and benzene, with hydrogen at 25°–35° C. and atmospheric pressure until the adsorption rate of hydrogen was negligible and the index of refraction approached 1.4500, requiring 6 to 8 hours. The catalyst was filtered off and 1,310 g. of dihydromyrcene, analyzing as follows, was obtained:

Sp. gr. @ 25°/25° C. _____ 0.7783.
$n_D^{20}$ _____ 1.4488–1.450.
Percent myrcene (by ultra violet) __ 0–6%.
Iodine value _____ 350–360.
Yield _____ 100.8% (by weight on myrcene).

Twelve hundred ninety-one (1,291) grams of the foregoing dihydromyrcene was warmed to 35° C. and while agitating and cooling 334 g. of HCl gas was passed in below the surface, requiring a period of 8 hours. The batch was agitated an additional hour and washed twice with cold water. The crude chloride amounted to 1,625 g. and analyzed 19.9% Cl. Yield 125.8% (by weight of dihydromyrcene). The crude can be used for saponification or purified by vacuum distillation.

The vacuum distillation of 710 g. (wet) of crude chloride (15.7% Cl) prepared from 584 g. dihydromyrcene and 116 g. HCl gave the following fractions:

I. 246 g. recovered dihydromyrcene, B. P. 58–76° C./19 mm. Hg
II. 316 g. chloride, B. P. 51–62° C./3 mm. Hg
III. 137 g. chloride, B. P. 62–84° C./3 mm. Hg Fractions II and III were combined and analyzed:

Percent Cl _____ 19.8%.
Sp. gr. @ 25°/25° C. _____ 0.9111.
$n_D^{20}$ _____ 1.4623.
Yield _____ 134.4% wt. on dihydromyrcene consumed.

EXAMPLE 2

*Preparation of dihydrolinalyl bromide*

Three hundred (300) grams of dihydromyrcene made in accordance with Example 1 and 210 g. of hydrogen bromide gas was processed as described in Example 1 and gave 518 g. (wet) crude bromide (39.1% Br). Yield 173% based on the weight of dihydromyrcene.

EXAMPLE 3

*Preparation of dihydrolinalool from dihydrolinalyl chloride*

1,625 g. crude dihydrolinalyl chloride (19.9% Cl) prepared as in Example 1 was agitated and heated 48 hours at 90° C. with 800 g. NaHCO₃ and 500 g. water. The formed salts were dissolved by the addition of water and the lower salt layer was separated and discarded. The oil layer was agitated an additional 8 hours with 100 g. NaHCO₃ and 200 g. water. Water was added and the oil layer separated and amounted to 1,343 g. The crude dihydrolinalool was vacuum distilled and gave the following fractions:

I. 592 g. recovered dihydromyrcene, B. P. 58–73° C./22 mm. ($n_D^{20}$ 1.510)
II. 726 g. dihydrolinalool, B. P. 55–104° C. and 15 g. of residue Yield 44.7% based on wt. of chloride and 103.8% based on wt. of dihydromyrcene consumed.

The recovered dihydromyrcene, 592 g., was reprocessed according to Example 1 and gave 744 g. of crude chloride. The chloride was processed as described above and gave 287 g. recovered dihydromyrcene and 269 g. dihydrolinalool. Yield 88% wt. on dihydromyrcene consumed. The dihydrolinalool was bulked (995 g.) and analyzed:

Percent purity _____ 98.4%
Sp. gr. @ 25°/25° C. _____ 0.8793
$n_D^{20}$ _____ 1.4580
Optical rotation _____ –6°0
Percent Cl _____ 4.3%

The total weight yield on dihydromyrcene is 86.7%, assuming a 50% value as indicated by analysis for the 287 g. of recovered dihydromyrcene.

The dihydrolinalool is generally similar to linalool in odor properties.

EXAMPLE 4

*Preparation of dihydrolinalool from dihydrolinalyl bromide*

518 g. of crude dihydrolinalyl bromide (39.1% Br) as prepared in Example 2 was agitated 12 hours at 40° C. with 150 g. NaHCO₃ and 1,500 g. water. The bottom salt solution layer was withdrawn after settling and the oil agitated an additional 18 hours at 40° C. with 100 g. NaHCO₃ and 1,000 g. of water. After settling, the oil was vacuum distilled and gave the following fractions:

I. 147 g. dihydromyrcene, B. P. 58–65° C./20 mm.
II. 129 g. dihydrolinalool, B. P. 60–90° C./4 mm., 3% Br The 129 g. of dihydrolinalool was refluxed 48 hours with 100 g. NaHCO₃ and 100 g. water. Water was added to dissolve the salts and the oil layer, 125 g. was separated and vacuum distilled. The following fractions were obtained:

I. 5 g., B. P. 36–45° C./4 mm., $n_D^{20}$ 1.4503
II. 10 g., B. P. 45–69° C./4 mm. $n_D^{20}$ 1.4560
III. 100 g., B. P. 69–72° C./4 mm., $n_D^{20}$ 1.4509
IV. 4.0 g., B. P. 72–84° C./4 mm., $n_D^{20}$ 1.4653

Fraction III was good dihydrolinalool analyzing:

Purity _____ 91.5%
Sp. gr. @ 25°/25° C. _____ 0.8686
$n_D^{20}$ _____ 1.4509
Br _____ Free Yield: 19.3% based on wt. of the bromide, and 67.5% based on wt. of dihydromyrcene consumed.

The dihydrolinalool made in accordance with the present example possessed the same odor qualities as those possessed by the dihydrolinalool made in accordance with Example 3.

EXAMPLE 5

*Preparation of dihydrolinalyl acetate*

Six hundred fifty-two (652) grams of dihydrolinalool prepared as in Example 3 was acetylated by heating with 432 g. of acetic anhydride and 150 g. of sodium acetate for 35 hours at 100° C. The mixture was agitated with 2000 ml. of water for 1 hour and allowed to settle. The aqueous layer was separated, extracted with 200 ml. of toluene. The toluene layer and the ester layer was combined, washed with 100 ml. of water, neutralized with 10% aqueous sodium bicarbonate. The aqueous layer was withdrawn and the toluene was removed by distillation. There remained 670 grams of crude acetate. The crude was distilled a 3 mm. Hg vacuum and gave the following fractions:

I. 101 g. recovered dihydromyrcene, B. P. 36–56° C., $n_D^{20}$ 1.4519
II. 105 g. chlorine containing fractions (50% dihydrolinalool), B. P. 56–67° C., $n_D^{20}$ 1.4430
III. 447 g. dihydrolinalyl acetate, B. P. 36–56° C., $n_D^{20}$ _____ 1.4440
Sp. gr. @ 25°/25° C. _____ 0.9043
Purity _____ 98.2%
Chlorine _____ Free 10 g. residue and yield : 76.8%

One hundred fifty (150) grams of dihydrolinalyl acetate, fraction III, was redistilled and gave the following fractions:

IV. 23 g., B. P. 66–68° C./3 mm., $n_D^{20}$ 1.4389
V. 101 g., B. P. 68–71° C./3 mm., $n_D^{20}$ 1.4400
VI. 16 g., B. P. 71–80° C./3 mm., $n_D^{20}$ 1.4523 and 5 g residue.

Fraction V was almost pure dihydrolinalyl acetate analyzing:

Purity ------------------------------------- 97.5%
Sp. gr. @ 25°/25° C.------------------------ 0.8899
$n_D^{20}$ ---------------------------------------- 1.4400

A sample saponified to dihydrolinalool gave a urethane derivative, M. P. 60.2–61.1° C.

The effect of the dihydrolinalyl acetate, prepared in accordance with this example, was generally similar to that of natural linalyl acetate in lavender-and bergamot-type perfume compositions.

EXAMPLE 6

*Preparation of Dihydrolinalool from dihydrolinalyl acetate*

Three hundred (300) grams of dihydrolinalyl acetate (98.2%, chlorine free) prepared as described in Example 5 was saponified with 220 g. of 45% KOH and 200 g. of methanol for 18 hours at reflux temperature. The mixture was allowed to settle and the aqueous layer was extracted with 200 ml. of benzene. The benzene and alcohol layer were combined and washed neutral with water. The benzene was removed by distillation and 230 grams of crude dihydrolinalool was obtained.

The crude alcohol was vacuum distilled at 5–6 mm. and gave the following fractions:

I. 11.2 g., B. P. up to 73° C., $n_D^{20}$ 1.4530
II. 200 g. dihydrolinalool, B. P. 73–82° C., $n_D^{20}$ 1.4570
III. 14.5 g., B. P. 82–85° C., $n_D^{20}$ 1.4799

Fraction III analyzed:

Purity ------------------------------------- 94%
Sp. gr. @ 25°/25° C.------------------------ 0.8645
$n_D^{20}$ ---------------------------------------- 1.4570
O. R. -------------------------------------- —3°0'
Yield -------------------------------------- 66.7%

Fraction III was determined to contain approximately 88% dihydrolinalool by fractionation and infra-red analysis.

The dihydrolinalool made in accordance with the present example possessed the same odor qualities as those possessed by dihydrolinalool made in accordance with Examples 3 and 4.

EXAMPLE 7

*Preparation of tetrahydrolinalool*

One hundred twenty-five (125) grams of dihydrolinalool (92%) prepared as described in Example 3, was hydrogenated 3 hours at 80° C. and 500 lbs. pressure using 5 g. Raney nickel catalyst. The catalyst was removed by filtration and the tetrahydrolinalool was vacuum distilled. The following fractions were collected:

I. 3.0 g., B. P. 28–63° C./3 mm. $n_D^{20}$ 1.4450
II. 102.0 g., B. P. 63–68° C./3 mm., $n_D^{20}$ 1.4380
III. 17 g., B. P. 68–72° C./3 mm., $n_D^{20}$ 1.4480

Fraction I contained chlorine and was assigned no value. Fraction II was tetrahydrolinalool:

Purity ------------------------------------- 100%
Sp. gr. @ 25°/25° C.------------------------ 0.8432
$n_D^{20}$ ---------------------------------------- 1.4380

Fraction III was assigned a value of 50% tetrahydrolinalool. Yield 88.3% based on wt. of dihydrolinalool.

The foregoing illustrates the practice of this invention, which, however, is not to be limited thereby but is to be construed as broadly as permissible in view of the prior art and limited solely by the appended claims.

I claim:

1. The process of making dihydrolinalool, which comprises saponifying a member selected from the group consisting of dihydrolinalyl chloride and dihydrolinalyl bromide at an elevated temperature with aqueous alkaline material, the amount of water present being sufficient to saponify said member and the amount of alkaline material present being sufficient to neutralize the liberated halogen halide.

2. The process of making dihydrolinalool, which comprises saponifying dihydrolinalyl chloride at a temperature within the range from about 60° to 100° C. with aqueous alkaline material, the amounts of water and of alkaline material used being in accordance with claim 1.

3. The process of making dihydrolinalool, which comprises saponifying dihydrolinalyl bromide at a temperature within the range from about 30° to 60° C., with aqueous alkaline material, the amounts of water and of alkaline material used being in accordance with claim 1.

4. The process of making dihydrolinalyl acetate, which comprises reacting dihydromyrcene with hydrogen chloride at a temperature within the range from about 0° to 70° C., saponifying the resulting dihydrolinalyl chloride at a temperature within the range from about 60° to 100° C. with aqueous alkaline material, the amount of water present being sufficient to saponify the dihydrolinalyl chloride and the amount of alkaline material being sufficient to neutralize the liberated hydrogen chloride, and acetylating the resulting dihydrolinalool at a temperature within the range from about 60° to 120° C. with acetic anhydride and sodium acetate in a ratio from about 1:0.66:0.24 to 1:1:0.5 parts by weight of dihydrolinalool, acetic anhydride and sodium acetate, respectively.

5. The process of making dihydrolinalyl acetate, which comprises forming dihydrolinalool in accordance with claim 1, and acetylating the dihydrolinalool in accordance with the acetylation step of claim 4.

References Cited in the file of this patent

UNITED STATES PATENTS 2,467,330    Milas ------------------ Apr. 12, 1949
2,609,388    Knapp et al. ------------ Sept. 2, 1952

OTHER REFERENCES

Simonsen: "The Terpenes," vol. 1, pp. 9–12 (1953).